United States Patent
Gilbert-Eyres et al.

(10) Patent No.: US 12,511,950 B2
(45) Date of Patent: Dec. 30, 2025

(54) SYSTEM AND METHOD FOR DETECTING ACCIDENTAL SERVICE BUTTON KEYPRESS

(71) Applicant: GM Global Technology Operations LLC, Detroit, MI (US)

(72) Inventors: Matthew Edward Gilbert-Eyres, Rochester Hills, MI (US); Russell A. Patenaude, Macomb Township, MI (US); Eric T. Hosey, Rochester Hills, MI (US); Benjamin Tran, Royal Oak, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 242 days.

(21) Appl. No.: 18/501,731

(22) Filed: Nov. 3, 2023

(65) Prior Publication Data
US 2025/0148836 A1    May 8, 2025

(51) Int. Cl.
  *G07C 5/00*    (2006.01)
(52) U.S. Cl.
  CPC ............ *G07C 5/008* (2013.01); *G07C 5/006* (2013.01)
(58) Field of Classification Search
  None
  See application file for complete search history.

(56) References Cited

U.S. PATENT DOCUMENTS

| | | | | |
|---|---|---|---|---|
| 9,491,420 B2* | 11/2016 | Mimar | ............... | G08B 21/0476 |
| 9,758,120 B2* | 9/2017 | Alamanos | ............... | B60R 21/00 |
| 2012/0164968 A1* | 6/2012 | Velusamy | ............. | H04W 4/027 |
| | | | | 455/404.2 |
| 2013/0069802 A1* | 3/2013 | Foghel | ................... | G08G 1/205 |
| | | | | 340/436 |
| 2013/0331055 A1* | 12/2013 | McKown | ............. | G08B 25/001 |
| | | | | 455/404.1 |
| 2021/0086778 A1* | 3/2021 | Suthar | ................... | B60W 40/08 |

* cited by examiner

Primary Examiner — Abdhesh K Jha
(74) Attorney, Agent, or Firm — Honigman LLP; Matthew H. Szalach; Jonathan P. O'Brien

(57) ABSTRACT

A computer-implemented method that, when executed by data processing hardware, causes data processing hardware to perform operations comprising receiving a service request associated with a service request button of a vehicle, receiving one or more service button engagement scoring inputs each associated with a corresponding vehicle status, calculating a service request confidence score based on the one or more service button engagement scoring inputs, assigning a service request cancellation period based on the one or more service button engagement scoring inputs, determining whether a cancellation request is received within the service request cancellation period, and either cancelling the service request when the cancellation request is received within the service request cancellation period, or transmitting the service request to a service provider when the cancellation request is not received within the service request cancellation period.

20 Claims, 5 Drawing Sheets

SYSTEM AND METHOD FOR DETECTING ACCIDENTAL SERVICE BUTTON KEYPRESS

INTRODUCTION

The information provided in this section is for the purpose of generally presenting the context of the disclosure. Work of the presently named inventors, to the extent it is described in this section, as well as aspects of the description that may not otherwise qualify as prior art at the time of filing, are neither expressly nor impliedly admitted as prior art against the present disclosure.

The present disclosure relates generally to a system and method for detecting an accidental or inadvertent engagement of a service request button in a vehicle, and more particularly, to scoring a likelihood that an engagement is accidental so that a service response can be prioritized.

Modern vehicles are often equipped with service request buttons, which allow a vehicle occupant to directly communicate with a vehicle service center or to request emergency services. For example, in the event of an accident or vehicle malfunction, a vehicle occupant may initiate a call to the vehicle service center to request emergency assistance at the vehicle location. Occasionally, the service request button may be inadvertently depressed by a vehicle occupant, thereby initiating a service request to the vehicle service center. While a vehicle occupant may attempt to cancel the inadvertent service request, the service request must still be reviewed and confirmed as being inadvertent by the vehicle service center prior to being dismissed or cancelled. Accordingly, these inadvertent service requests require significant advisor time to ensure the button engagement was intentional, which leads to excess cost.

SUMMARY

One aspect of the disclosure provides a computer-implemented method that, when executed by data processing hardware, causes the data processing hardware to perform operations. These operations include receiving a service request associated with a service request button of a vehicle, receiving one or more service button engagement scoring inputs each associated with a corresponding vehicle status, calculating a service request confidence score based on the one or more service button engagement scoring inputs, assigning a service request cancellation period based on the one or more service button engagement scoring inputs, determining whether a cancellation request is received within the service request cancellation period, and either cancelling the service request when the cancellation request is received within the service request cancellation period, or transmitting the service request to a service provider when the cancellation request is not received within the service request cancellation period.

Implementations of the disclosure may include one or more of the following optional features. In some examples, the method includes determining a service request history including an aggregate quantity of service requests associated with the vehicle, and when the aggregate quantity of service requests is equal to one, initiating a service button prompt.

In some implementations, the one or more service button engagement scoring inputs include at least one of the following: a service button engagement quantity, a service button engagement duration, a call button engagement status, a diagnostic trouble code status, a vehicle location status, a vehicle operation status, an automatic braking event status, vehicle weather conditions, a vehicle-related call status, a vehicle alarm status, a vehicle panic status, an adjacent button engagement status, a vehicle child occupant status, a vehicle mirror adjustment status, or a vehicle operator history.

In some examples, calculating the service request confidence score includes increasing the service request confidence score based on a first one of the one or more service button engagement scoring inputs, or decreasing the service request confidence score based on a second one of the one or more service button engagement scoring inputs.

In some configurations, calculating the service request confidence score includes increasing the service request confidence score based on at least one of the service button engagement quantity, the service button engagement duration, the call button engagement status, the diagnostic trouble code status, the vehicle location status, the vehicle operation status, the automatic braking event status, the vehicle weather conditions, the vehicle-related call status, the vehicle alarm status, or the vehicle panic status.

In some implementations, calculating the service request confidence score includes decreasing the service request confidence score based on at least one of the adjacent button engagement status, the vehicle child occupant status, the vehicle mirror adjustment status, and the vehicle location status.

In some configurations, assigning a service request cancellation period based on the one or more service button engagement scoring inputs includes determining whether the calculated service request confidence score exceeds a first threshold, and either assigning a first service request cancellation period having a first duration when the calculated service request confidence score does not exceed the first threshold, or assigning a second service request cancellation period having a second duration when the calculated service request confidence score does exceed the first threshold, the second duration being less than the first duration.

Another aspect of the disclosure provides a system having processing hardware and memory hardware in communication with data processing hardware. The memory hardware stores instructions that, when executed on the data processing hardware, cause the data processing hardware to perform operations. These operations include receiving a service request associated with a service request button of a vehicle, receiving one or more service button engagement scoring inputs each associated with a corresponding vehicle status, calculating a service request confidence score based on the one or more service button engagement scoring inputs, assigning a service request cancellation period based on the one or more service button engagement scoring inputs, determining whether a cancellation request is received within the service request cancellation period, and either cancelling the service request when the cancellation request is received within the service request cancellation period, or transmitting the service request to a service provider when the cancellation request is not received within the service request cancellation period.

Implementations of this aspect of the disclosure may include one or more of the following features. In some examples, the operations include determining a service request history including an aggregate quantity of service requests associated with the vehicle, and when the aggregate quantity of service requests is equal to one, initiating a service button prompt.

In some implementations, the one or more service button engagement scoring inputs include at least one of the following: a service button engagement quantity, a service button engagement duration, a call button engagement status, a diagnostic trouble code status, a vehicle location status, a vehicle operation status, an automatic braking event status, vehicle weather conditions, a vehicle-related call status, a vehicle alarm status, a vehicle panic status, an adjacent button engagement status, a vehicle child occupant status, a vehicle mirror adjustment status, or a vehicle operator history.

In some configurations, calculating the service request confidence score includes increasing the service request confidence score based on a first one of the one or more service button engagement scoring inputs, or decreasing the service request confidence score based on a second one of the one or more service button engagement scoring inputs.

In some implementations, calculating the service request confidence score includes increasing the service request confidence score based on at least one of the service button engagement quantity, the service button engagement duration, the call button engagement status, the diagnostic trouble code status, the vehicle location status, the vehicle operation status, the automatic braking event status, the vehicle weather conditions, the vehicle-related call status, the vehicle alarm status, or the vehicle panic status.

In some examples, calculating the service request confidence score includes decreasing the service request confidence score based on at least one of the adjacent button engagement status, the vehicle child occupant status, the vehicle mirror adjustment status, and the vehicle location status.

In some configurations, assigning a service request cancellation period based on the one or more service button engagement scoring inputs includes determining whether the calculated service request confidence score exceeds a first threshold, and either assigning a first service request cancellation period having a first duration when the calculated service request confidence score does not exceed the first threshold, or assigning a second service request cancellation period having a second duration when the calculated service request confidence score does exceed the first threshold, the second duration being less than the first duration.

An additional aspect of the disclosure provides a vehicle management system. The vehicle management system includes a communication system including a service request button associated with a service request, data processing hardware, and memory hardware in communication with the data processing hardware. The memory hardware stores instructions that, when executed on the data processing hardware, cause the data processing hardware to perform operations. These operations include receiving a service request associated with the service request button, receiving one or more service button engagement scoring inputs each associated with a respective vehicle environmental condition, calculating a service request confidence score based on the one or more service button engagement scoring inputs, assigning a service request cancellation period based on the one or more service button engagement scoring inputs, determining whether a cancellation request is received within the service request cancellation period, and either cancelling the service request when the cancellation request is received within the service request cancellation period, or transmitting the service request to a service provider when the cancellation request is not received within the service request cancellation period.

Implementations of this aspect of the disclosure may include one or more of the following optional features. In some examples, the vehicle management system includes determining a service request history including an aggregate quantity of service requests associated with the vehicle, and when the aggregate quantity of service requests is equal to one, initiating a service button prompt.

In some implementations, the one or more service button engagement scoring inputs include at least one of the following: a service button engagement quantity, a service button engagement duration, a call button engagement status, a diagnostic trouble code status, a vehicle location status, a vehicle operation status, an automatic braking event status, vehicle weather conditions, a vehicle-related call status, a vehicle alarm status, a vehicle panic status, an adjacent button engagement status, a vehicle child occupant status, a vehicle mirror adjustment status, or a vehicle operator history.

In some configurations, calculating the service request confidence score includes increasing the service request confidence score based on a first one of the one or more service button engagement scoring inputs, or decreasing the service request confidence score based on a second one of the one or more service button engagement scoring inputs.

In some examples, calculating the service request confidence score includes increasing the service request confidence score based on at least one of the service button engagement quantity, the service button engagement duration, the call button engagement status, the diagnostic trouble code status, the vehicle location status, the vehicle operation status, the automatic braking event status, the vehicle weather conditions, the vehicle-related call status, the vehicle alarm status, or the vehicle panic status. Calculating the service request confidence score includes decreasing the service request confidence score based on at least one of the adjacent button engagement status, the vehicle child occupant status, the vehicle mirror adjustment status, and the vehicle location status.

In some implementations, assigning a service request cancellation period based on the one or more service button engagement scoring inputs includes determining whether the calculated service request confidence score exceeds a first threshold, and either assigning a first service request cancellation period having a first duration when the calculated service request confidence score does not exceed the first threshold, or assigning a second service request cancellation period having a second duration when the calculated service request confidence score does exceed the first threshold, the second duration being less than the first duration.

BRIEF DESCRIPTION OF THE DRAWINGS

The drawings described herein are for illustrative purposes only of selected configurations and are not intended to limit the scope of the present disclosure.

Corresponding reference numerals indicate corresponding parts throughout the drawings.

DETAILED DESCRIPTION

Figure 1A:
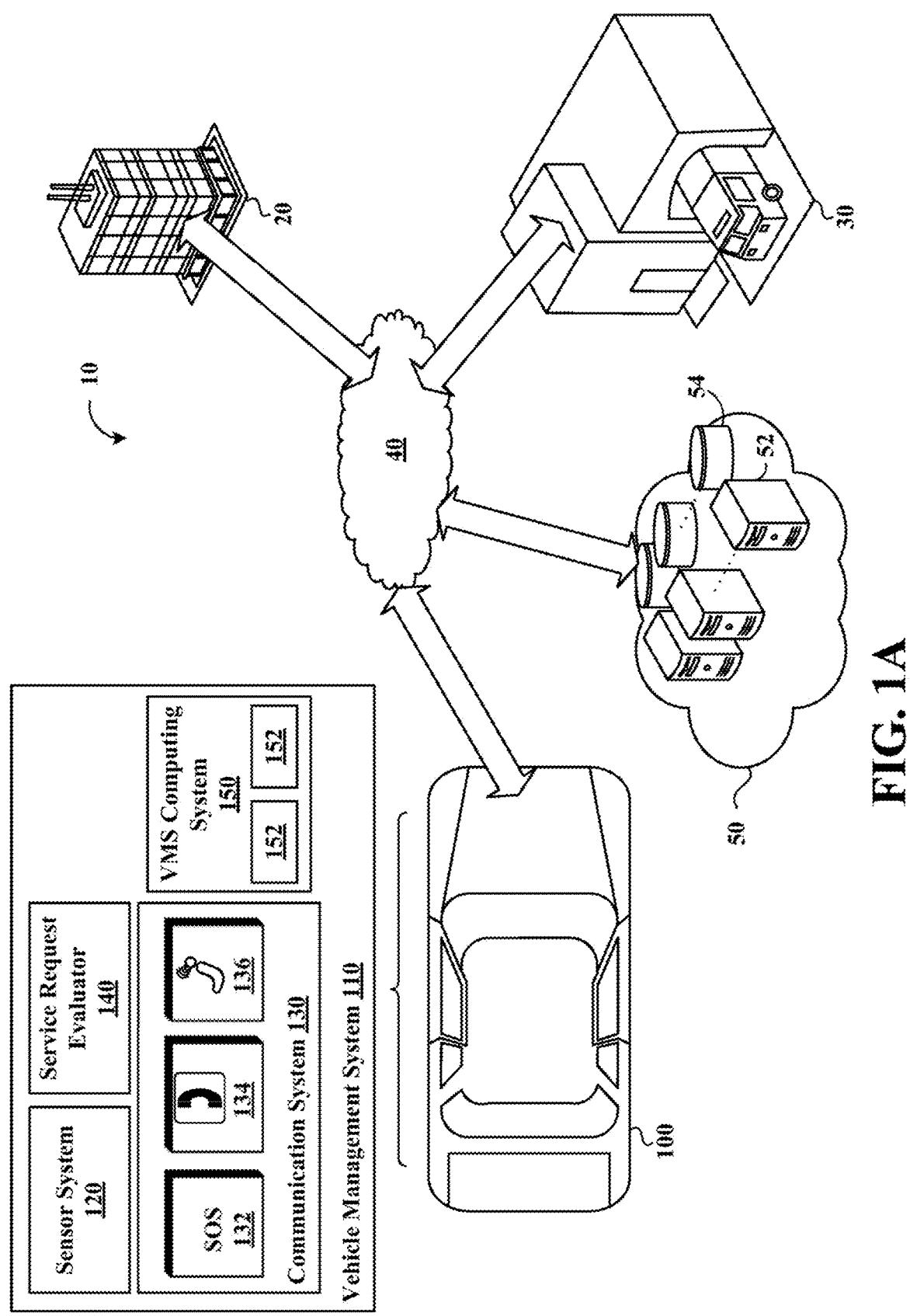
FIG. 1A is a schematic diagram of a vehicle environment including a vehicle management system according to the principles of the present disclosure.

Example configurations will now be described more fully with reference to the accompanying drawings. Example configurations are provided so that this disclosure will be thorough, and will fully convey the scope of the disclosure to those of ordinary skill in the art. Specific details are set forth such as examples of specific components, devices, and methods, to provide a thorough understanding of configurations of the present disclosure. It will be apparent to those of ordinary skill in the art that specific details need not be employed, that example configurations may be embodied in many different forms, and that the specific details and the example configurations should not be construed to limit the scope of the disclosure.

The terminology used herein is for the purpose of describing particular exemplary configurations only and is not intended to be limiting. As used herein, the singular articles "a," "an," and "the" may be intended to include the plural forms as well, unless the context clearly indicates otherwise. The terms "comprises," "comprising," "including," and "having," are inclusive and therefore specify the presence of features, steps, operations, elements, and/or components, but do not preclude the presence or addition of one or more other features, steps, operations, elements, components, and/or groups thereof. The method steps, processes, and operations described herein are not to be construed as necessarily requiring their performance in the particular order discussed or illustrated, unless specifically identified as an order of performance. Additional or alternative steps may be employed.

When an element or layer is referred to as being "on," "engaged to," "connected to," "attached to," or "coupled to" another element or layer, it may be directly on, engaged, connected, attached, or coupled to the other element or layer, or intervening elements or layers may be present. In contrast, when an element is referred to as being "directly on," "directly engaged to," "directly connected to," "directly attached to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

The terms "first," "second," "third," etc. may be used herein to describe various elements, components, regions, layers and/or sections. These elements, components, regions, layers and/or sections should not be limited by these terms. These terms may be only used to distinguish one element, component, region, layer or section from another region, layer or section. Terms such as "first," "second," and other numerical terms do not imply a sequence or order unless clearly indicated by the context. Thus, a first element, component, region, layer or section discussed below could be termed a second element, component, region, layer or section without departing from the teachings of the example configurations.

In this application, including the definitions below, the term "module" may be replaced with the term "circuit." The term "module" may refer to, be part of, or include an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor (shared, dedicated, or group) that executes code; memory (shared, dedicated, or group) that stores code executed by a processor; other suitable hardware components that provide the described functionality; or a combination of some or all of the above, such as in a system-on-chip.

The term "code," as used above, may include software, firmware, and/or microcode, and may refer to programs, routines, functions, classes, and/or objects. The term "shared processor" encompasses a single processor that executes some or all code from multiple modules. The term "group processor" encompasses a processor that, in combination with additional processors, executes some or all code from one or more modules. The term "shared memory" encompasses a single memory that stores some or all code from multiple modules. The term "group memory" encompasses a memory that, in combination with additional memories, stores some or all code from one or more modules. The term "memory" may be a subset of the term "computer-readable medium." The term "computer-readable medium" does not encompass transitory electrical and electromagnetic signals propagating through a medium, and may therefore be considered tangible and non-transitory memory. Non-limiting examples of a non-transitory memory include a tangible computer readable medium including a nonvolatile memory, magnetic storage, and optical storage.

The apparatuses and methods described in this application may be partially or fully implemented by one or more computer programs executed by one or more processors. The computer programs include processor-executable instructions that are stored on at least one non-transitory tangible computer readable medium. The computer programs may also include and/or rely on stored data.

A software application (i.e., a software resource) may refer to computer software that causes a computing device to perform a task. In some examples, a software application may be referred to as an "application," an "app," or a "program." Example applications include, but are not limited to, system diagnostic applications, system management applications, system maintenance applications, word processing applications, spreadsheet applications, messaging applications, media streaming applications, social networking applications, and gaming applications.

The non-transitory memory may be physical devices used to store programs (e.g., sequences of instructions) or data (e.g., program state information) on a temporary or permanent basis for use by a computing device. The non-transitory memory may be volatile and/or non-volatile addressable semiconductor memory. Examples of non-volatile memory include, but are not limited to, flash memory and read-only memory (ROM)/programmable read-only memory (PROM)/erasable programmable read-only memory (EPROM)/electronically erasable programmable read-only memory (EEPROM) (e.g., typically used for firmware, such as boot programs). Examples of volatile memory include, but are not limited to, random access memory (RAM), dynamic random access memory (DRAM), static random access memory (SRAM), phase change memory (PCM) as well as disks or tapes.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" and "computer-readable medium" refer to any computer program product, non-transitory computer readable medium, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

Various implementations of the systems and techniques described herein can be realized in digital electronic and/or optical circuitry, integrated circuitry, specially designed ASICS (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

The processes and logic flows described in this specification can be performed by one or more programmable processors, also referred to as data processing hardware, executing one or more computer programs to perform functions by operating on input data and generating output. The processes and logic flows can also be performed by special purpose logic circuitry, e.g., an FPGA (field programmable gate array) or an ASIC (application specific integrated circuit). Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, one or more aspects of the disclosure can be implemented on a computer having a display device, e.g., a CRT (cathode ray tube), LCD (liquid crystal display) monitor, or touch screen for displaying information to the user and optionally a keyboard and a pointing device, e.g., a mouse or a trackball, by which the user can provide input to the computer. Other kinds of devices can be used to provide interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Figure 1B:
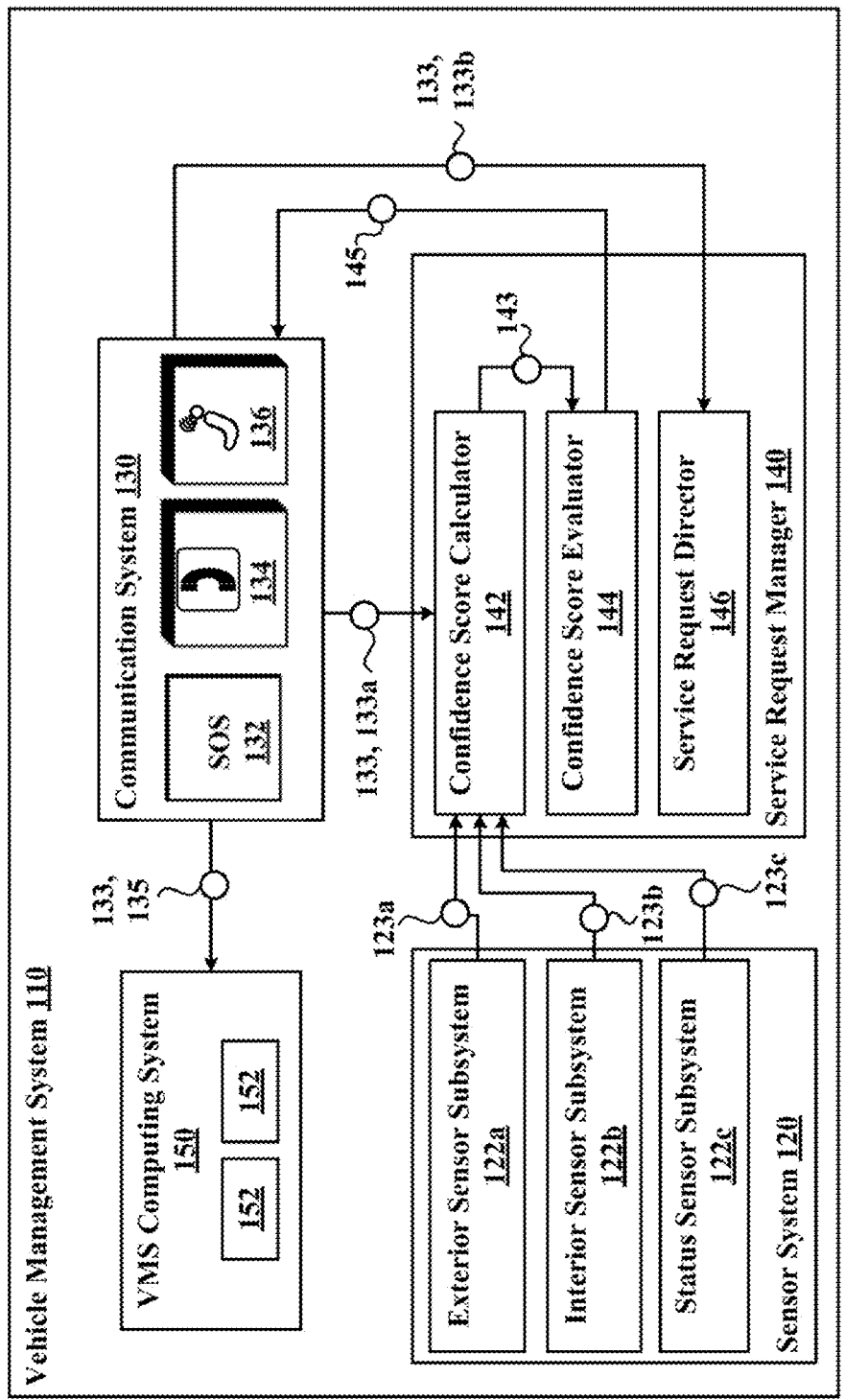
FIG. 1B is an enlarged schematic diagram showing an example of the vehicle management system according to the principles of the present disclosure.

Referring to FIGS. 1A and 1B, an example vehicle operating environment 10 is provided for illustration of the principles of the present disclosure. The vehicle operating environment 10 includes a vehicle 100, a vehicle service center 20, and a vehicle service provider 30. For the sake of illustration, the vehicle operating environment 10 is shown as including a single vehicle service center 20 and a single vehicle service provider 30. However, in other examples, the vehicle operating environment 10 may include a plurality of vehicle service centers 20 and vehicle service providers 30 in communication over a network 40 (e.g., the Internet, cellular networks). Vehicle service providers 30 may include emergency service providers, such as fire, medical, or law enforcement services, or vehicle maintenance services, such as repair or towing services.

The vehicle 100 includes a vehicle management system 110 including a sensor system 120, a communication system 130, and a service request manager 140. While the vehicle 100 maneuvers about the environment 10, the sensor system 120 includes various sensor subsystems 122, 122a-123c configured to gather sensor data 123, 123a-123c relating to characteristics of the environment 10 and/or status of the vehicle 100. For instance, the sensor subsystems 122 include a vehicle exterior sensor subsystem 122a configured to measure or obtain external environmental data 123a, such as weather or surrounding objects (e.g., vehicles, pedestrians), an interior sensor subsystem 122b configured to measure interior environmental data 123b, such as vehicle occupancy, and/or a vehicle status subsystem 122c configured to measure or obtain vehicle operating data 123c, such as vehicle location and operating parameters. As the sensor system 120 gathers the sensor data 123, a computing system 150 is configured to store, process, and/or communicate the sensor data 123 within the vehicle operating environment 10. In order to perform computing tasks related to the sensor data 123, the computing system 150 of the vehicle 100 includes data processing hardware 152 and memory hardware 154. The data processing hardware 152 is configured to execute instructions stored in the memory hardware 154 to perform computing tasks related to operation and management of the vehicle 100. Generally speaking, the computing system 150 refers to one or more locations of data processing hardware 152 and/or memory hardware 154.

In some examples, the computing system 150 is a local system located on the vehicle 100 (e.g., vehicle control unit). When located on the vehicle 100, the computing system 150 may be centralized (i.e., in a single location/area on the vehicle 100, for example, a vehicle control unit), decentralized (i.e., located at various locations about the vehicle 100), or a hybrid combination of both (e.g., with a majority of centralized hardware and a minority of decentralized hardware). To illustrate some differences, a decentralized computing system 150 may allow processing to occur at an activity location (e.g., at the communication system 130) while a centralized computing system 150 may allow for a central processing hub that communicates to systems located at various positions on the vehicle 100 (e.g., communicate to the communication system 130).

Additionally or alternatively, the computing system 150 includes computing resources that are located remotely from the vehicle 100. For instance, the computing system 150 may communicate via the network 40 with a remote vehicle computing system 50 (e.g., a remote computer/server or a cloud-based environment). Much like the computing system 150, the remote vehicle computing system 50 includes remote computing resources such as remote data processing hardware 52 and remote memory hardware 54. Here, sensor data 123 or other processed data (e.g., data processing locally by the computing system 150) may be stored in the remote vehicle computing system 50 and may be accessible to the computing system 150. In some examples, the computing system 150 is configured to utilize the remote resources 52, 54 as extensions of the computing resources 152, 154 such that resources of the computing system 150 may reside on resources of the remote vehicle computing system 50.

The communication system 130 of the vehicle 100 provides an interface for facilitating communication, both locally at the vehicle 100 and externally to the service center 20 and service providers 30 via the network 40. In the illustrated example, the communication system 130 includes one or more communication buttons 132, 134, 136, including an emergency (SOS) service request button 132, a service call button 134, and an interior voice command button 136 for providing voice commands to the vehicle management system 110. The communication buttons 132, 134, 136 may be embodied as physical buttons integrated into the vehicle interior (e.g., steering wheel, rear-view mirror) or as rendered buttons integrated into a touch-sensitive graphical user interface (e.g., vehicle infotainment system). Accordingly, the communication buttons 132, 134, 136 are easily accessible to a vehicle occupant. The vehicle communication system 130 may communicate with the computing system 150 and/or the remote vehicle computing system 50. Thus, upon engagement (e.g., depression, touch) of one of the communication buttons 132, 134, 136, a corresponding communication request 133, 135 is transmitted from the communication system 130 to initiate the communication. Particularly, engagement of the support service request button 132 generates a support service request 133 and engagement of the service call button 134 generates a call request 135. As discussed herein, the support service request button 132 may be engaged a first time to generate a support service initiation request 133a and may be engaged a second time to generate a support service cancellation request 133b. Alternatively, the communication system 130 may include separate support service request buttons 132 for initiating and cancelling the support service request 133.

With continued reference to FIGS. 1A and 1B, the vehicle management system 110 includes a service request manager 140, which is executed at the local vehicle computing system 150 and/or the remote vehicle computing system 50 in the manner previously described. The service request manager 140 is configured to receive a support service request 133 from the communication system 130 and to determine a priority for the support service request 133 based on the sensor data 123, 123a-123b provided by the sensor system 120. More particularly, the service request manager 140 includes a confidence score calculator 142 configured to receive the support service initiation request 133a and determine the likelihood that the support service initiation request 133a was intentionally initiated by a vehicle occupant by calculating a service request confidence score $SRC_{calc}$, which is provided as service request confidence score data 143. The service request manager 140 further includes a confidence score evaluator 144 configured to evaluate the service request confidence score data 143 and determine whether the calculated service request confidence score $SRC_{calc}$ satisfies one or more threshold service request confidence scores $SRC_{hresh}$ to provide cancellation request instructions 145 to the vehicle occupant via a vehicle user interface.

Figure 2A:
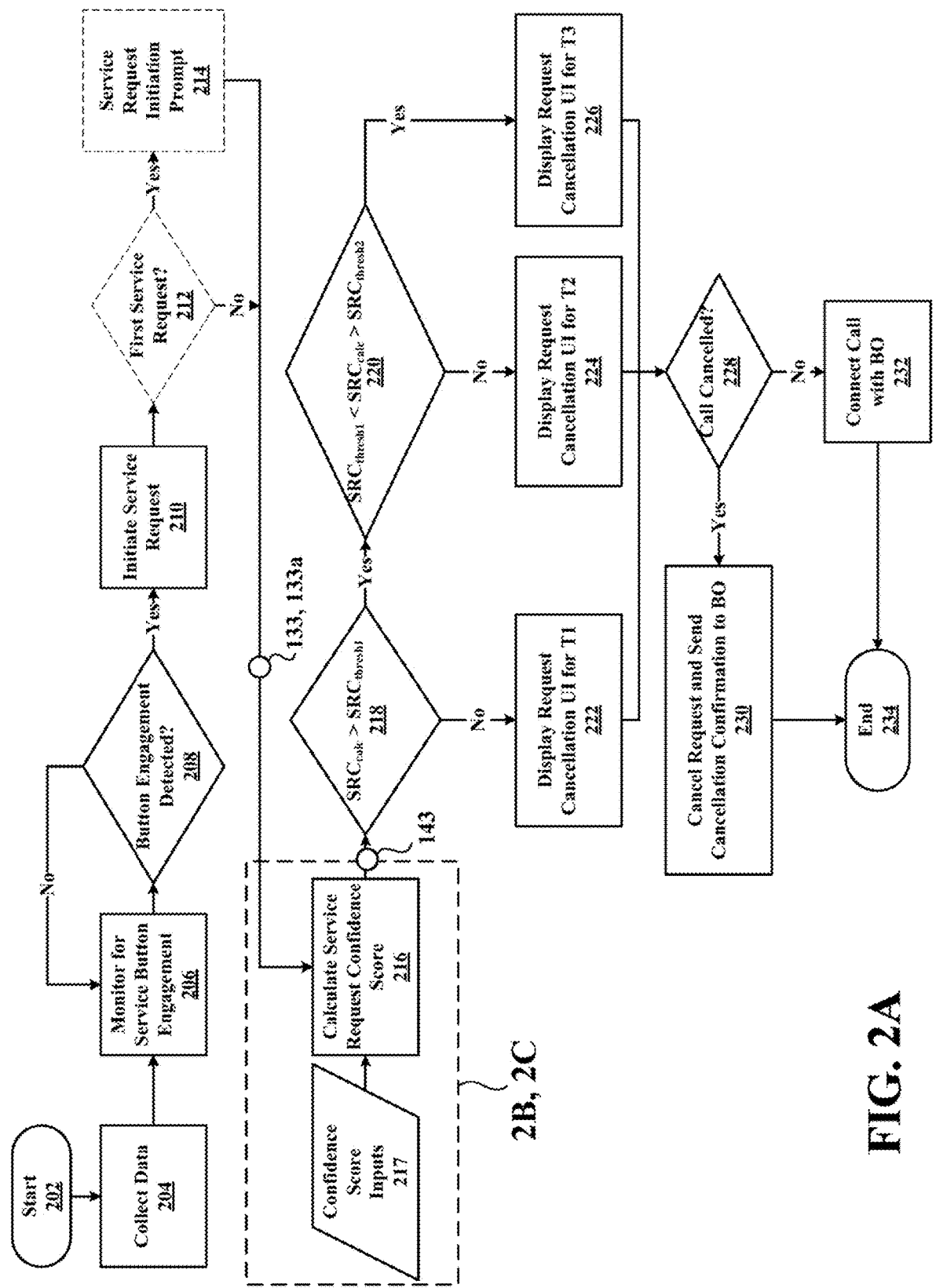
FIG. 2A is a flow diagram showing operations of the vehicle management system of FIG. 1B.
Figure 2B:
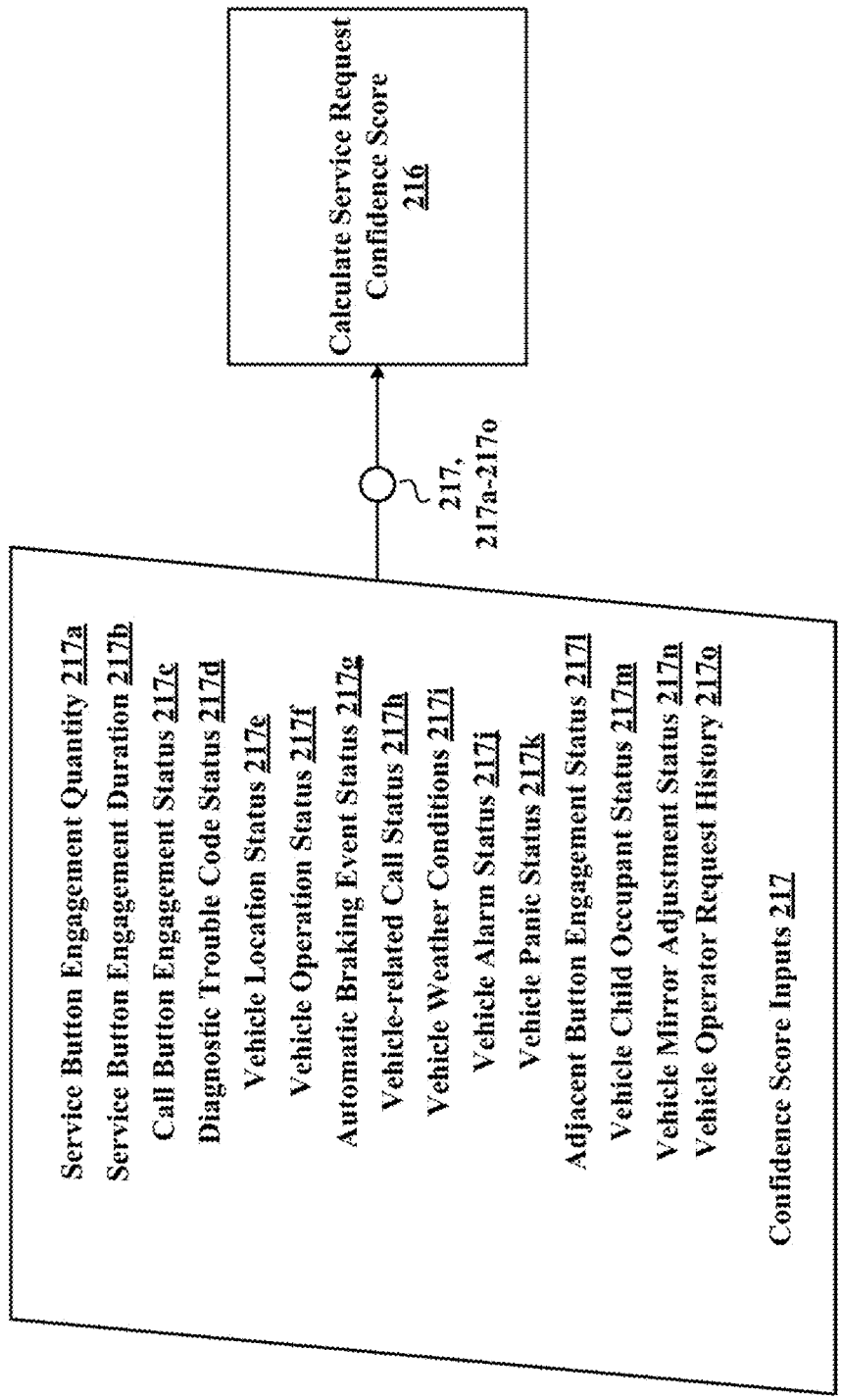
FIG. 2B is a detailed view of the flow diagram of FIG. 2A, showing confidence score inputs used in the method of FIG. 2A.
Figure 2C:
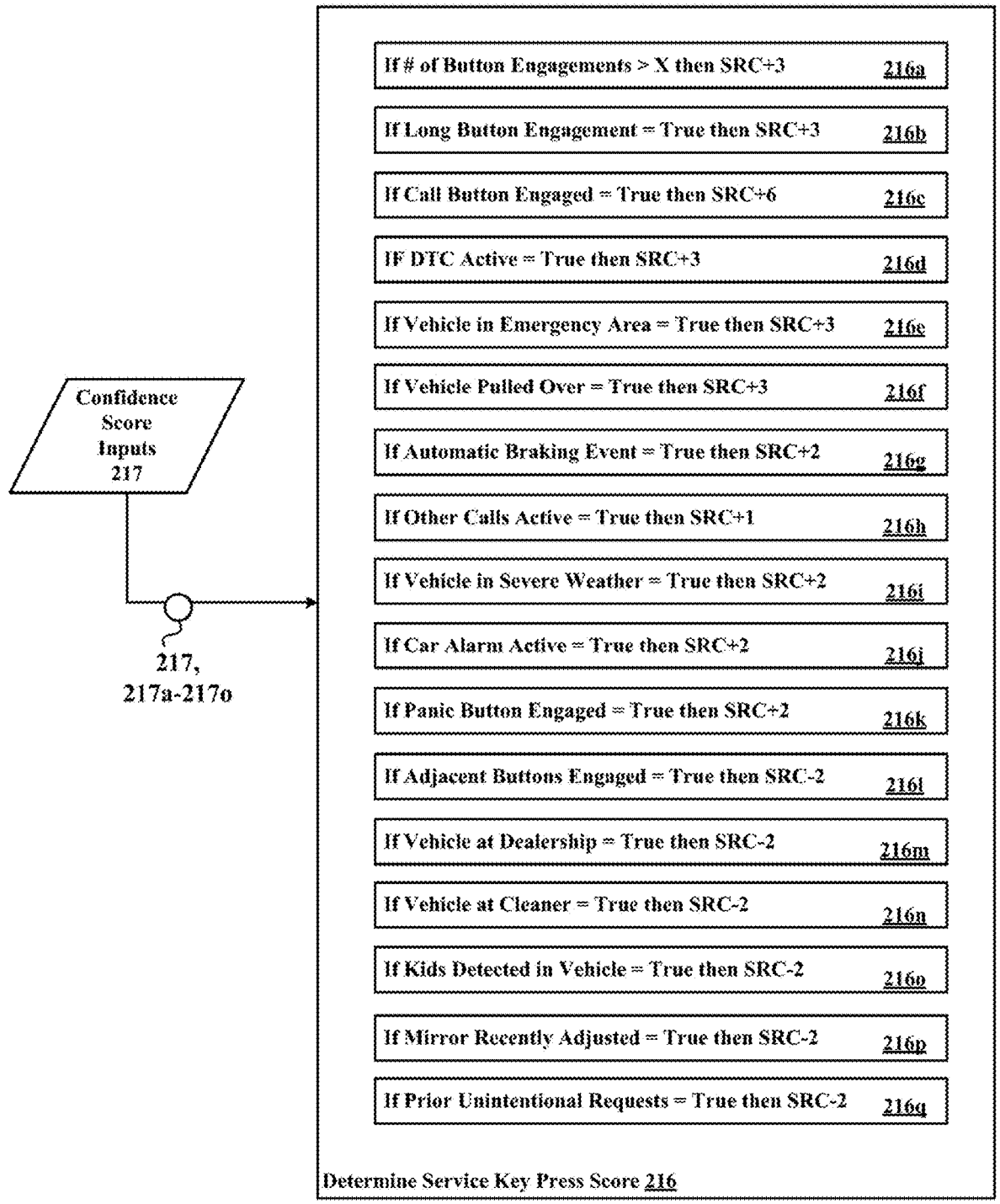
FIG. 2C is a detailed view of the flow diagram of FIG. 2A, showing sub-steps for calculating a service request confidence score.

Referring to FIGS. 2A-2C, a method 200 for determining a likelihood that a support service request 133 is intentional or unintentional is provided. At a first step 202, the method 200 is initiated. In practical terms, the method 200 may be initiated upon powering-up of the vehicle 100 by the vehicle operator. Upon initiation, the vehicle sensor system 120 begins collecting the sensor data 123, 123a-123c from one or more of the exterior sensor subsystem 122a, the interior sensor subsystem 122b, and the vehicle status subsystem 122c at a data collection step 204. As discussed in greater detail below, the sensor data 123, 123a-123c may be utilized by the confidence score calculator 142 as service request scoring inputs 217 for calculating the service request confidence score $SRC_{calc}$.

At another step 206, which may occur subsequently or concurrently to the data collection step 204, the vehicle management system 110 (e.g., the communication system 130) monitors for engagement of the emergency (SOS) service request button 132 and determines whether the emergency (SOS) service request button 132 has been engaged at step 208. When the vehicle management system 110 determines that the emergency (SOS) service request button 132 has not been engaged, the vehicle management system 110 continues monitoring for an emergency (SOS) service request button 132 engagement. Conversely, when the service request manager 140 determines that the emergency (SOS) service request button 132 has been engaged, the vehicle management system 110 proceeds to step 210 and instructs the communication system 130 to transmit a support service initiation request 133a to the service request manager 140.

Optionally, the vehicle management system 110 may evaluate an engagement history of the emergency (SOS) service request button 132 stored in the memory hardware 54, 154 to determine whether the emergency (SOS) service request button 132 has been previously engaged. When the vehicle management system 110 determines that the emergency (SOS) service request button 132 has not previously been engaged (i.e., this is the first time a vehicle operator has ever pressed the emergency (SOS) service request button 132) at step 212, the vehicle management system 110 instructs the communication system 130 to provide a service request initiation prompt at step 214. The prompt may include a visual prompt on a display of the vehicle 100 and/or an audio prompt provided through a vehicle audio system, and may include information for using the emergency (SOS) service request button 132.

When the vehicle management system 112 determines that the emergency (SOS) service request button 132 has been previously engaged (i.e., answer at step 212 is "no"), the vehicle management system 112 instructs the communication system 130 to proceed with transmitting a support service initiation request 133a to the service request manager 140 for evaluation. At step 216, the confidence score calculator 142 receives the support service initiation request 133a and the sensor data 123, 123a-123b and calculates the service request confidence score $SRC_{calc}$.

With reference to FIGS. 2B and 2C, the inputs 217, 217a-217o and sub-steps 216a-216q executed by the confidence score calculator 142 at step 216 are shown in detail. The confidence score calculator 142 receives one or more of the confidence score inputs 217, 217a-217o and evaluates the confidence score inputs 217, 217a-217o at sub-steps 216a-216q to determine whether to increase the support request confidence score (SRC+) or decrease the support request confidence score (SRC−). Referring to FIGS. 2B and 2C, a first sub-step 216a includes evaluating a service button engagement quantity 217a identifying a number of times that the emergency (SOS) service request button 132 has been engaged in a period of time preceding the support service initiation request 133a. This period of time may be referred to as a service request look-back period, and may be a duration selected to include corresponding engagements. For example, the service button engagement quantity 217a may include the number of instances that the emergency (SOS) service request button 132 has been depressed within the preceding one-minute period. In this example, when the confidence score calculator 142 determines that the service button engagement quantity 217a exceeds a threshold value (x) within the one-minute period, then the confidence score calculator 142 increases the calculated support request confidence score $SRC_{calc}$ by three points (SRC+3). This increase in the calculated support request confidence score $SRC_{calc}$ corresponds to the determination that an emergency (SOS) service request button 132 engagement is more likely to be intentional where a vehicle operator engaged the emergency (SOS) multiple times in a set period.

At sub-step 216b, the confidence score calculator 142 evaluates a service button engagement duration 217b identifying a duration that the emergency (SOS) service request button 132 was engaged in a single engagement and/or during a set period of time. For example, the service button engagement duration 217b may indicate the duration of the preceding engagement or a total duration of engagements during the look-back period. In this example, when the confidence score calculator 142 determines that the service button engagement duration 217b is a "long button engagement" (i.e., exceeds a threshold engagement duration), then the confidence score calculator 142 increases the calculated support request confidence score $SRC_{calc}$ by three points (SRC+3). This increase in the calculated support request confidence score $SRC_{calc}$ corresponds to the determination that an emergency (SOS) service request button 132 engagement is more likely to be intentional where a vehicle operator engaged the emergency (SOS) for a long duration of time.

At sub-step 216c, the confidence score calculator 142 evaluates a call button engagement status 217c indicating whether the call button 134 has also been engaged by the vehicle operator. In this example, when the confidence score calculator 142 determines that the call button engagement status 217c indicates that the call button 134 has also been engaged, then the confidence score calculator 142 increases the calculated support request confidence score $SRC_{calc}$ by six points (SRC+6). This increase in the calculated support request confidence score $SRC_{calc}$ corresponds to the determination that an emergency (SOS) service request button 132 engagement is more likely to be intentional where a vehicle operator engaged both the call button 134 and the emergency (SOS) service request button 132. Collectively, the inputs 217a-217c may be referred to as communication system status inputs 217a-217c.

At sub-step 216d, the confidence score calculator 142 evaluates a diagnostic trouble code status 217d obtained from a vehicle diagnostic system (i.e., part of the vehicle status subsystem 122c). The diagnostic trouble code status 217d may indicate whether the vehicle 100 is malfunctioning or damaged. In this example, when the confidence score calculator 142 determines that the diagnostic trouble code status 217d indicates that the vehicle 100 has an active diagnostic trouble code, then the confidence score calculator 142 increases the calculated support request confidence score $SRC_{calc}$ by three points (SRC+3). This increase in the calculated support request confidence score $SRC_{calc}$ corresponds to the determination that an emergency (SOS) service request button 132 engagement is more likely to be intentional where a vehicle 100 has a malfunction associated with a diagnostic trouble code.

At sub-step 216e, the confidence score calculator 142 evaluates a vehicle location status 217e provided by a positioning system (e.g., a Global Positioning System (GPS)) of the vehicle 100. In this example, when the confidence score calculator 142 determines that the vehicle location status 217e is associated with an emergency area (e.g., off-road), then the confidence score calculator 142 increases the calculated support request confidence score $SRC_{calc}$ by three points (SRC+3). This increase in the calculated support request confidence score $SRC_{calc}$ corresponds to the determination that an emergency (SOS) service request button 132 engagement is more likely to be intentional where a vehicle 100 is not on a road or is in an emergency location.

At sub-step 216f, the confidence score calculator 142 evaluates a vehicle operation status 217f indicating whether the vehicle 100 is being operated (i.e., moving) or is at a stop (i.e., pulled over). In this example, when the confidence score calculator 142 determines that the vehicle operation status 217f indicates that the vehicle 100 is pulled over on a roadway, then the confidence score calculator 142 increases the calculated support request confidence score $SRC_{calc}$ by three points (SRC+3). This increase in the calculated support request confidence score $SRC_{calc}$ corresponds to the determination that an emergency (SOS) service request button 132 engagement is more likely to be intentional where a vehicle is stopped on the side of a road.

At sub-step 216g, the confidence score calculator 142 evaluates an automatic braking event status 217g indicating whether an automatic braking system associated with an advanced driver-assistance system of the vehicle 100 has been activated. In this example, when the confidence score calculator 142 determines that the automatic braking event status 217g indicates that the vehicle 100 has experienced an automatic braking event, then the confidence score calculator 142 increases the calculated support request confidence score $SRC_{calc}$ by two points (SRC+2). This increase in the calculated support request confidence score $SRC_{calc}$ corresponds to the determination that an emergency (SOS) service request button 132 engagement is more likely to be intentional where a vehicle 100 has initiated automatic braking.

At sub-step 216h, the confidence score calculator 142 evaluates a vehicle-related call status 217h indicating whether the vehicle service center 20 has received support service requests 133 or service calls from other vehicles that are located in a nearby vicinity to the vehicle 100. In this example, when the confidence score calculator 142 determines other vehicles have initiated support service requests 133 or service calls in a vicinity of the vehicle 100, then the confidence score calculator 142 increases the calculated support request confidence score $SRC_{calc}$ by one point (SRC+). This increase in the calculated support request confidence score $SRC_{calc}$ corresponds to the determination that an emergency (SOS) service request button 132 engagement is more likely to be intentional where other vehicles in the area of the vehicle 100 are also requesting communication or service.

At sub-step 216*i*, the confidence score calculator 142 evaluates vehicle weather conditions 217*i* indicating whether the vehicle 100 is currently located in severe weather. In this example, when the confidence score calculator 142 determines that the vehicle weather conditions 217*i* indicate that the vehicle 100 is in severe weather, then the confidence score calculator 142 increases the calculated support request confidence score $SRC_{calc}$ by two points (SRC+2). This increase in the calculated support request confidence score $SRC_{calc}$ corresponds to the determination that an emergency (SOS) service request button 132 engagement is more likely to be intentional where a vehicle 100 is in severe weather.

At sub-step 216*j*, the confidence score calculator 142 evaluates a vehicle alarm status 217*j* indicating whether an alarm system of the vehicle 100 has been activated. In this example, when the confidence score calculator 142 determines that the vehicle alarm status 217*j* indicates that the vehicle 100 alarm is active, then the confidence score calculator 142 increases the calculated support request confidence score $SRC_{calc}$ by two points (SRC+2). This increase in the calculated support request confidence score $SRC_{calc}$ corresponds to the determination that an emergency event is more likely when the vehicle 100 alarm is activated.

At sub-step 216*k*, the confidence score calculator 142 evaluates a vehicle panic status 217*k* indicating whether a panic system of the vehicle 100 has been activated. In this example, when the confidence score calculator 142 determines that the vehicle panic status 217*k* indicates that the vehicle 100 panic system is active, then the confidence score calculator 142 increases the calculated support request confidence score $SRC_{calc}$ by two points (SRC+2). This increase in the calculated support request confidence score $SRC_{calc}$ corresponds to the determination that an emergency (SOS) service request button 132 engagement is more likely to be intentional when the vehicle 100 panic system activated. For clarity, the vehicle alarm system and the vehicle panic system are distinguishable in that the vehicle alarm system is configured to activate automatically when the vehicle is disturbed (e.g., door handle pull, window broken) while the vehicle panic system is configured to be manually activated by a vehicle operator, typically via a remote device.

While the foregoing sub-steps 216*a*-216*k* relate to evaluating support request confidence score inputs 217*a*-217*k* associated with increasing the support request confidence score (SRC) in connection with an increased likelihood that the vehicle 100 is in an emergency event, the confidence score calculator 142 also evaluates support request confidence score inputs 217*l*-217*q* associated with decreasing the support request confidence score (SRC) in connection with a decreased likelihood that the vehicle 100 is in an emergency event. For example, at sub-step 216*l*, the confidence score calculator 142 evaluates an adjacent button status 217*l* indicating whether other buttons of the vehicle 100 (e.g., voice command button, garage door button) that are located near the emergency (SOS) service request button 132 have been engaged during the look-back period. In this example, when the confidence score calculator 142 determines that the adjacent button status 217*l* indicates that other buttons adjacent to the emergency (SOS) service request button 132 have been engaged, then the confidence score calculator 142 decreases the calculated support request confidence score $SRC_{calc}$ by two points (SRC−2). This decrease in the calculated support request confidence score $SRC_{calc}$ corresponds to the determination that an emergency (SOS) service request button 132 engagement was less likely to be intentional when other adjacent buttons were also engaged at the same time as the emergency (SOS) service request button 132.

At sub-step 216*m*, the confidence score calculator 142 evaluates the vehicle location status 217*e*. In this example, when the confidence score calculator 142 determines that the vehicle location status 217*e* indicates that the vehicle 100 is located at a maintenance center, then the confidence score calculator 142 decreases the calculated support request confidence score $SRC_{calc}$ by two points (SRC−2). This decrease in the calculated support request confidence score $SRC_{calc}$ corresponds to the determination that an emergency (SOS) service request button 132 engagement was less likely to be intentional if the vehicle 100 is undergoing maintenance services where the emergency (SOS) service request button 132 may be inadvertently engaged by maintenance personnel.

At sub-step 216*n*, the confidence score calculator 142 evaluates the vehicle location status 217*e*. In this example, when the confidence score calculator 142 determines that the vehicle location status 217*e* indicates that the vehicle 100 is located at a cleaner, then the confidence score calculator 142 decreases the calculated support request confidence score $SRC_{calc}$ by two points (SRC−2). This decrease in the calculated support request confidence score $SRC_{calc}$ corresponds to the determination that an emergency (SOS) service request button 132 engagement was less likely to be intentional if the vehicle 100 is undergoing cleaning services where the emergency (SOS) service request button 132 may be inadvertently engaged by cleaning personnel.

At sub-step 216*o*, the confidence score calculator 142 evaluates a vehicle child occupant status 217*m*, which may be provided by the interior sensor subsystem 222*b* (e.g., cameras, seatbelt sensors, seat weight sensors). In this example, when the confidence score calculator 142 determines that a child is in the vehicle 100, then the confidence score calculator 142 decreases the calculated support request confidence score $SRC_{calc}$ by two points (SRC−2). This decrease in the calculated support request confidence score $SRC_{calc}$ corresponds to the determination that an emergency (SOS) service request button 132 engagement was less likely to be intentional and more likely to be unintentionally caused by a child when a child is present in the vehicle 100.

At sub-step 216*p*, the confidence score calculator 142 evaluates the vehicle mirror adjustment status 217*n* indicating whether the vehicle rear-view mirror (i.e., where the emergency (SOS) service request button 132 may be located) has been adjusted or moved during the look-back period. In this example, when the confidence score calculator 142 determines that the vehicle mirror adjustment status 217*n* indicates that the rear-view mirror of the vehicle 100 was adjusted during the look-back period, then the confidence score calculator 142 decreases the calculated support request confidence score $SRC_{calc}$ by two points (SRC−2). This decrease in the calculated support request confidence score $SRC_{calc}$ corresponds to the determination that an emergency (SOS) service request button 132 engagement was less likely to be intentional when the rear-view mirror is being adjusted by a vehicle operator where the emergency (SOS) service request button 132 is located on the rear-view mirror.

At sub-step 216*q*, the confidence score calculator 142 evaluates a vehicle operator request history 2170 indicating whether a vehicle operator associated with the vehicle (i.e., the owner) has previously unintentionally engaged the emergency (SOS) service request button 132. In this example, when the confidence score calculator 142 determines that the vehicle operator associated with the vehicle (i.e., the owner) has previously unintentionally engaged the emergency (SOS) service request button 132, then the confidence score calculator 142 decreases the calculated support request confidence score $SRC_{calc}$ by two points (SRC−2). This decrease in the calculated support request confidence score $SRC_{calc}$ corresponds to the determination that an emergency (SOS) service request button 132 engagement was less likely to be intentional when the vehicle operator has a history of unintentional button engagements.

Referring again to FIGS. 1B and 2A, the service request confidence score data 143 including the calculated service request confidence score $SRC_{calc}$ is provided to the confidence score evaluator 144 at step 218 and step 220. The confidence score evaluator 144 determines whether the calculated service request confidence score $SRC_{calc}$ exceeds a first threshold service request confidence score $SRC_{thresh1}$ or a second threshold service request confidence score $SRC_{thresh2}$ and assigns a corresponding service request cancellation period T1, T2, T3 via the cancellation request instructions 145. At step 218, the confidence score evaluator 144 determines whether the calculated service request confidence score $SRC_{calc}$ exceeds the first threshold service request confidence score $SRC_{thresh1}$. When the calculated service request confidence score $SRC_{calc}$ does not exceed the first threshold service request confidence score $SRC_{thresh1}$ (i.e., answer at step 218 is "no"), the confidence score evaluator 144 assigns a first service request cancellation period T1 and transmits corresponding cancellation request instructions 145 to the vehicle passenger via a vehicle user interface and/or the communication system 130.

When the calculated service request confidence score $SRC_{calc}$ does exceed the first threshold service request confidence score $SRC_{thresh1}$ (i.e., answer at step 218 is "yes"), the confidence score evaluator 144 proceeds to step 220 and determines whether the calculated service request confidence score $SRC_{calc}$ exceeds the second threshold service request confidence score $SRC_{thresh2}$. When the calculated service request confidence score $SRC_{calc}$ does not exceed the second threshold service request confidence score $SRC_{thresh2}$ (i.e., answer at step 220 is "no"), the confidence score evaluator 144 assigns a second service request cancellation period T2 that is shorter in duration than the first service request cancellation period T1 and transmits corresponding cancellation request instructions 145 to the vehicle passenger via a vehicle user interface or the communication system 130. The shorter duration of the second service request cancellation period T2 corresponds to the calculated service request confidence score $SRC_{calc}$ required for the second service request cancellation period T2 being greater than the calculated service request confidence score $SRC_{calc}$ required for the first service request cancellation period T1, indicating that it is more likely that the emergency (SOS) service request button 132 was intentionally engaged.

When the calculated service request confidence score $SRC_{calc}$ does exceed the second threshold service request confidence score $SRC_{thresh2}$ (i.e., answer at step 220 is "yes"), the confidence score evaluator 144 assigns a third service request cancellation period T3 that is shorter in duration than the second service request cancellation period T2 and transmits corresponding cancellation request instructions 145 to the vehicle passenger via a vehicle user interface and/or the communication system 130. The shorter duration of the third service request cancellation period T3 corresponds to the calculated service request confidence score $SRC_{calc}$ required for the third service request cancellation period T3 being greater than the calculated service request confidence score $SRC_{calc}$ required for the second service request cancellation period T2, indicating that it is more likely that the emergency (SOS) service request button 132 was intentionally engaged.

At steps 222, 224, and 226, the respective cancellation request instructions 145 cause the assigned service request cancellation period T1, T2, T3 to be displayed and/or announced to the vehicle operator. For example, the vehicle operator may receive a visual or audio prompt with information instructing the vehicle operator of the duration of service request cancellation period T1, T2, T3 so that the vehicle operator may cancel the support service initiation request 133a. At step 228, the service request manager 140 monitors for a support service cancellation request 133b from the communication system 130, which may be initiated by the vehicle operator by engaging the emergency (SOS) service request button 132 or a separate request cancellation button. When the service request manager 140 determines that a support service cancellation request 133b has been received (i.e., the answer at step 228 is "yes"), the service request manager 140 transmits the support service cancellation request 133b to the service center 20 to cancel the support service initiation request 133a at step 230. Conversely, when the service request manager 140 determines that a support service cancellation request 133b has not been received (i.e., the answer at step 228 is "no"), the service request manager 140 instructs the service center 20 to connect with the vehicle communication system 130 at step 232. The method is then completed at step 234.

In addition to calculating the service request confidence score $SRC_{calc}$ for evaluation by the service request manager 140 as set forth in the foregoing paragraphs, the calculated service request confidence score $SRC_{calc}$ may also be evaluated at the service center 20 to determine a support service request priority. For example, support service initiation requests 133a having a greater calculated service request confidence score $SRC_{calc}$ may be prioritized over support service initiation requests 133a having lower service request confidence score $SRC_{calc}$. Additionally or alternatively, the service center 20 may evaluate the service request confidence score $SRC_{calc}$ to determine a corresponding response from the service providers 30.

A number of implementations have been described. Nevertheless, it will be understood that various modifications may be made without departing from the spirit and scope of the disclosure. Accordingly, other implementations are within the scope of the following claims.

The foregoing description has been provided for purposes of illustration and description. It is not intended to be exhaustive or to limit the disclosure. Individual elements or features of a particular configuration are generally not limited to that particular configuration, but, where applicable, are interchangeable and can be used in a selected configuration, even if not specifically shown or described. The same may also be varied in many ways. Such variations are not to be regarded as a departure from the disclosure, and all such modifications are intended to be included within the scope of the disclosure.

What is claimed is:

1. A computer-implemented method that, when executed by data processing hardware, causes the data processing hardware to perform operations comprising:
   receiving a service request associated with a service request button of a vehicle;

receiving one or more service button engagement scoring inputs each associated with a corresponding vehicle status;

calculating a service request confidence score based on the one or more service button engagement scoring inputs;

assigning a service request cancellation period based on the one or more service button engagement scoring inputs;

determining whether a cancellation request is received within the service request cancellation period; and either (i) cancelling the service request when the cancellation request is received within the service request cancellation period or (ii) transmitting the service request to a service provider when the cancellation request is not received within the service request cancellation period.

2. The method of claim 1, further comprising:

determining a service request history including an aggregate quantity of service requests associated with the vehicle; and when the aggregate quantity of service requests is equal to one, initiating a service button prompt.

3. The method of claim 1, wherein the one or more service button engagement scoring inputs include at least one of the following:

a service button engagement quantity;
a service button engagement duration;
a call button engagement status;
a diagnostic trouble code status;
a vehicle location status;
a vehicle operation status;
an automatic braking event status;
vehicle weather conditions;
a vehicle-related call status;
a vehicle alarm status;
a vehicle panic status;
an adjacent button engagement status;
a vehicle child occupant status;
a vehicle mirror adjustment status; or
a vehicle operator history.

4. The method of claim 3, wherein calculating the service request confidence score includes increasing the service request confidence score based on a first one of the one or more service button engagement scoring inputs or decreasing the service request confidence score based on a second one of the one or more service button engagement scoring inputs.

5. The method of claim 4, wherein calculating the service request confidence score includes increasing the service request confidence score based on at least one of the service button engagement quantity, the service button engagement duration, the call button engagement status, the diagnostic trouble code status, the vehicle location status, the vehicle operation status, the automatic braking event status, the vehicle weather conditions, the vehicle-related call status, the vehicle alarm status, or the vehicle panic status.

6. The method of claim 5, wherein calculating the service request confidence score includes decreasing the service request confidence score based on at least one of the adjacent button engagement status, the vehicle child occupant status, the vehicle mirror adjustment status, and the vehicle location status.

7. The method of claim 1, wherein assigning a service request cancellation period based on the one or more service button engagement scoring inputs comprises:

determining whether the calculated service request confidence score exceeds a first threshold; and either (i) assigning a first service request cancellation period having a first duration when the calculated service request confidence score does not exceed the first threshold or (ii) assigning a second service request cancellation period having a second duration when the calculated service request confidence score does exceed the first threshold, the second duration being less than the first duration.

8. A system comprising:

data processing hardware; and memory hardware in communication with the data processing hardware, the memory hardware storing instructions that, when executed on the data processing hardware, cause the data processing hardware to perform operations comprising:

receiving a service request associated with a service request button of a vehicle;

receiving one or more service button engagement scoring inputs each associated with a corresponding vehicle status;

calculating a service request confidence score based on the one or more service button engagement scoring inputs;

assigning a service request cancellation period based on the one or more service button engagement scoring inputs;

determining whether a cancellation request is received within the service request cancellation period; and either (i) cancelling the service request when the cancellation request is received within the service request cancellation period or (ii) transmitting the service request to a service provider when the cancellation request is not received within the service request cancellation period.

9. The system of claim 8, further comprising:

determining a service request history including an aggregate quantity of service requests associated with the vehicle; and when the aggregate quantity of service requests is equal to one, initiating a service button prompt.

10. The system of claim 8, wherein the one or more service button engagement scoring inputs include at least one of the following:

a service button engagement quantity;
a service button engagement duration;
a call button engagement status;
a diagnostic trouble code status;
a vehicle location status;
a vehicle operation status;
an automatic braking event status;
vehicle weather conditions;
a vehicle-related call status;
a vehicle alarm status;
a vehicle panic status;
an adjacent button engagement status;
a vehicle child occupant status;
a vehicle mirror adjustment status; or
a vehicle operator history.

11. The system of claim 10, wherein calculating the service request confidence score includes increasing the service request confidence score based on a first one of the one or more service button engagement scoring inputs or decreasing the service request confidence score based on a second one of the one or more service button engagement scoring inputs.

12. The system of claim 11, wherein calculating the service request confidence score includes increasing the service request confidence score based on at least one of the service button engagement quantity, the service button engagement duration, the call button engagement status, the diagnostic trouble code status, the vehicle location status, the vehicle operation status, the automatic braking event status, the vehicle weather conditions, the vehicle-related call status, the vehicle alarm status, or the vehicle panic status.

13. The system of claim 12, wherein calculating the service request confidence score includes decreasing the service request confidence score based on at least one of the adjacent button engagement status, the vehicle child occupant status, the vehicle mirror adjustment status, and the vehicle location status.

14. The system of claim 8, wherein assigning a service request cancellation period based on the one or more service button engagement scoring inputs comprises:
  determining whether the calculated service request confidence score exceeds a first threshold; and
  either (i) assigning a first service request cancellation period having a first duration when the calculated service request confidence score does not exceed the first threshold or (ii) assigning a second service request cancellation period having a second duration when the calculated service request confidence score does exceed the first threshold, the second duration being less than the first duration.

15. A vehicle management system comprising:
  a communication system including a service request button associated with a service request,
  data processing hardware; and
  memory hardware in communication with the data processing hardware, the memory hardware storing instructions that, when executed on the data processing hardware, cause the data processing hardware to perform operations comprising:
    receiving a service request associated with the service request button;
    receiving one or more service button engagement scoring inputs each associated with a respective vehicle environmental condition;
    calculating a service request confidence score based on the one or more service button engagement scoring inputs;
    assigning a service request cancellation period based on the one or more service button engagement scoring inputs;
    determining whether a cancellation request is received within the service request cancellation period; and
    either (i) cancelling the service request when the cancellation request is received within the service request cancellation period or (ii) transmitting the service request to a service provider when the cancellation request is not received within the service request cancellation period.

16. The vehicle management system of claim 15, further comprising:
  determining a service request history including an aggregate quantity of service requests associated with the vehicle management system; and
  when the aggregate quantity of service requests is equal to one, initiating a service button prompt.

17. The vehicle management system of claim 15, wherein the one or more service button engagement scoring inputs include at least one of the following:
  a service button engagement quantity;
  a service button engagement duration;
  a call button engagement status;
  a diagnostic trouble code status;
  a vehicle location status;
  a vehicle operation status;
  an automatic braking event status;
  vehicle weather conditions;
  a vehicle-related call status;
  a vehicle alarm status;
  a vehicle panic status;
  an adjacent button engagement status;
  a vehicle child occupant status;
  a vehicle mirror adjustment status; or
  a vehicle operator history.

18. The vehicle management system of claim 17, wherein calculating the service request confidence score includes increasing the service request confidence score based on a first one of the one or more service button engagement scoring inputs or decreasing the service request confidence score based on a second one of the one or more service button engagement scoring inputs.

19. The vehicle management system of claim 18, wherein calculating the service request confidence score includes:
  increasing the service request confidence score based on at least one of the service button engagement quantity, the service button engagement duration, the call button engagement status, the diagnostic trouble code status, the vehicle location status, the vehicle operation status, the automatic braking event status, the vehicle weather conditions, the vehicle-related call status, the vehicle alarm status, or the vehicle panic status; and
  decreasing the service request confidence score based on at least one of the adjacent button engagement status, the vehicle child occupant status, the vehicle mirror adjustment status, and the vehicle location status.

20. The vehicle management system of claim 15, wherein assigning a service request cancellation period based on the one or more service button engagement scoring inputs comprises:
  determining whether the calculated service request confidence score exceeds a first threshold; and
  either (i) assigning a first service request cancellation period having a first duration when the calculated service request confidence score does not exceed the first threshold or (ii) assigning a second service request cancellation period having a second duration when the calculated service request confidence score does exceed the first threshold, the second duration being less than the first duration.

* * * * *